US011761568B2

(12) United States Patent
Guest

(10) Patent No.: US 11,761,568 B2
(45) Date of Patent: Sep. 19, 2023

(54) CONNECTOR

(71) Applicant: JOHN GUEST INTERNATIONAL LIMITED, Middlesex (GB)

(72) Inventor: Timothy Steven Guest, Middlesex (GB)

(73) Assignee: JOHN GUEST INTERNATIONAL LIMITED, Middlesex (GB)

( * ) Notice: Subject to any disclaimer, the term of this patent is extended or adjusted under 35 U.S.C. 154(b) by 472 days.

(21) Appl. No.: 16/962,510

(22) PCT Filed: Jan. 11, 2019

(86) PCT No.: PCT/GB2019/050071
§ 371 (c)(1),
(2) Date: Jul. 15, 2020

(87) PCT Pub. No.: WO2019/141968
PCT Pub. Date: Jul. 25, 2019

(65) Prior Publication Data
US 2020/0347976 A1    Nov. 5, 2020

(30) Foreign Application Priority Data

Jan. 17, 2018  (GB) ..................... 1800719

(51) Int. Cl.
*F16L 37/091*   (2006.01)
*F16L 37/092*   (2006.01)
(52) U.S. Cl.
CPC ......... *F16L 37/0925* (2013.01); *F16L 37/091* (2013.01); *F16L 37/092* (2013.01); *F16L 37/0927* (2019.08)
(58) Field of Classification Search
CPC ... F16L 37/091; F16L 37/092; F16L 37/0925; F16L 37/0927; F16L 37/0915
See application file for complete search history.

(56) References Cited

U.S. PATENT DOCUMENTS 4,632,437 A   12/1986   Robson et al.
5,029,908 A    7/1991   Belisaire
(Continued)

FOREIGN PATENT DOCUMENTS

DE   10 2007 015 406 B3   1/2008
EP        0 378 035 A1    7/1990
(Continued)

OTHER PUBLICATIONS

Combined Search and Exam Report Issued in GB Patent Application No. 1800719.5 dated Jun. 19, 2018, five (5) pages.
(Continued)

*Primary Examiner* — Aaron M Dunwoody
(74) *Attorney, Agent, or Firm* — Barnes & Thornburg LLP

(57) ABSTRACT

A connector comprising a body (1) having a through-way defining an axis and which is open at one end (4) and a shoulder (8) in the through-way faces the open end and supports an O-ring (9). A cap (2) is fitted within an open end of the body and extends from the open end towards the opposite end, the cap being retained in the body (1) by a snap fit. The cap has a plurality of legs (24) extending away from the open end, the legs each having an outwardly extending tooth (22) at the end opposite to the open end to engage with a complimentary recess (12) in the body to provide the snap fit. A collet (3) in the cap has a plurality of legs (31) extending away from the open end, at least one collet leg engaging with a leg of the cap and having an inwardly facing tooth (32) to grip a tube in the through-way. The cap (2) has an inwardly facing tapered surface (29) that is tapered to provide a cap angle that engages with the collet legs (31) such that axial movement of the collet (3) towards the open end (4) causes inward deflection of the collet legs and causes a radially outward force to be applied to the legs (24) of the (Continued)

cap (2) via the tapered surface (29) to urge the or each tooth of the cap into its respective complimentary recess (12).

20 Claims, 3 Drawing Sheets

(56) References Cited

U.S. PATENT DOCUMENTS

| | | | |
|---|---|---|---|
| 2005/0077723 | A1 | 4/2005 | Wai |
| 2006/0228621 | A1 | 10/2006 | Jones et al. |
| 2008/0238096 | A1 | 10/2008 | Kees et al. |
| 2011/0140417 | A1 | 6/2011 | Kluss et al. |
| 2012/0104749 | A1 | 5/2012 | Kang |
| 2014/0021717 | A1* | 1/2014 | Burke .................. F16L 37/091 285/321 |
| 2016/0017579 | A1* | 1/2016 | Schurle ................ E03C 1/0403 137/315.01 |
| 2017/0082229 | A1 | 3/2017 | Meissner |

FOREIGN PATENT DOCUMENTS

| | | | |
|---|---|---|---|
| EP | 1433992 | A1 | 6/2004 |
| EP | 1 517 075 | A2 | 3/2005 |
| EP | 1 972 845 | A1 | 9/2008 |
| EP | 2 131 089 | A1 | 12/2009 |
| EP | 2 860 436 | A1 | 4/2015 |
| EP | 3 236 127 | A1 | 10/2017 |
| JP | 2018-017336 | A | 2/2018 |
| KR | 20050023988 | A | 3/2005 |
| KR | 20170054122 | A | 5/2017 |
| WO | WO-2005/024284 | A1 | 3/2005 |

OTHER PUBLICATIONS

Examination report issued in GB Patent Application No. 1800719.5 dated May 21, 2020, three (3) pages.
International Search Report and Written Opinion issued in International Application No. PCT/GB2019/050071 dated Apr. 5, 2019, nine (9) pages.
Combined Search and Examination Report issued in UK Patent Application No. 1806919.5 dated Oct. 26, 2018, five (5) pages.
International Search Report and Written Opinion issued in International Application No. PCT/GB2019/051174 dated Jun. 18, 2019, nine (9) pages.
Office Action; U.S. Appl. No. 17/050,714; dated Mar. 31, 2023.

\* cited by examiner

CONNECTOR

CROSS-REFERENCE TO RELATED APPLICATIONS

The present application is a national stage entry of PCT/GB2019/050071 filed Jan. 11, 2019 and claims the benefit of priority to GB Patent Application No. 1800719.5 filed Jan. 17, 2018, the entire contents of which are incorporated herein by reference.

BRIEF SUMMARY OF THE INVENTION

The present invention relates to a connector of the type comprising a cap and a body which are assembled together to provide a through way. A collet is retained within the assembly. The collet has a plurality of legs each having an inwardly facing tooth. A tubular element is inserted into the through way of the connector, this is gripped by the teeth of the collet. If an axial force is applied which tends to remove the tubular element from the connector, the legs of the collet engage with a feature on the connector to urge the legs of the collet inwardly to grip the tube. The greater the axial force which is applied, the greater the gripping force applied by the teeth.

BACKGROUND OF THE INVENTION

Such connectors have found widespread use in applications for connecting plastic tubes and the like, for example in plumbing, electrical cables and fibre optic applications. They provide a quick and reliable method of joining two cables together or connecting a cable to another component.

Traditionally, the cap has been ultrasonically welded to the body and this has been commercially successful. However, it does have a number of drawbacks in that the welding process requires complex equipment. The materials of the cap and body must be compatible with one another and suitable for ultrasonic welding. The components must also be sufficiently thick and robust to allow the welding.

We have made a number of attempts to improve on such a connector.

EP2860436 discloses a snap fit engagement of a cap over the body to replace the ultrasound weld. The introduction in this document refers to a connector in which the end of the cap opposite to the open end is provided with an inwardly facing annular shoulder which is fitted over a complimentary outwardly facing annular shoulder on the body. However, there are problems with such a design. Firstly, the cap with the annular shoulder has to expand radially as it is pushed onto the body which strains the caps. Secondly, when a bending load is applied to the connector, this tends to pull the snap ring away from the shoulder on one side but forces the components together on the opposite side thereby causing stresses which can crack or dislodge the cap. This is addressed in EP2860436 by providing the body with a plurality of fingers which extend toward the open end such that the snap fit is achieved towards the open end. These fingers are more flexible than an annular component which reduces the stresses upon bending. It is also easier for the fingers to deflect (as compared to the annular shoulder) when the cap is put into place thereby avoiding stresses during assembly.

A development to this idea is described in EP3236127 which uses a similar idea to that described above, only the cap angle (i.e. the surface which is inclined to engage with the collet to cause it to grip on a tube as the tube is pulled away from the open end) is now formed on the inner face of axially projecting legs of the body.

WO2005/024284 discloses an arrangement in which a cap is provided as a snap fit within the body, rather than over the body as in the above described prior art. The cap has a castellated structure with a number of legs each of which is provided with a tooth which will snap into a recess in the body. The collet has a number of legs each of which will engage with an inner edge of the cap which is defined between the legs of the cap.

The present invention aims at providing an improvement of the snap fit connector arrangement which provides a more stable engagement between the body, cap and collet.

According to the present invention, there is provided a connector.

Unlike EP2860436 and EP3236127, the cap is within the body, rather than being fitted over the body. As compared with WO2005/024284 the connector of the present invention has a completely different engagement between the collet, cap and body. In the present invention, there is engagement between at least one leg of the collet and a leg of the cap. Further, the cap has an inwardly facing taper to engage with a collet leg. A combination of these features causes a radially outward force to be applied to the teeth of the cap via the tapered surface to urge each tooth of the cap into its respective complimentary recess. As a result of this, an axial force on a tube inserted into the connector which is gripped by the collet teeth will cause the collet to be forced along the cap angle thereby compressing the collet legs and generating an increased gripping force on the tube. At the same time, because of the alignment between the legs of the collect and the leg of the cap, this will also generate a resultant radially outward force on the teeth of the cap which tends to urge the teeth of the cap into the complimentary recess.

The greater the axial force applied to the tube, the greater the gripping force in both directions will be, such that the greater axial force will provide a greater radial force between the body, cap and collet thereby providing a form of positive feedback which ensures that the connector maintains its integrity even under relatively high axial forces.

None of this is possible with the connector of WO2005/024284. This connector is specifically designed so that the legs of the collet engage with parts of the cap which are between the legs of the cap. Further, the collet is required to engage with an edge of the cap in order to generate the gripping force between the teeth of the collet and the tube. When axial force is applied to a tube within the collet in WO2005/024284, no radially outward force can be applied to the legs of the cap, such that no radial force is applied to the teeth of the cap which engage with the recesses in the body. Under a high load it is therefore much easier for the teeth of the cap to become dislodged from the body which effectively represents a failure of the connector. Further, because the collect engages with an edge of the cap rather than a tapered surface as in the present invention, a high force will tend to cause this edge to dig into the collet leg thereby providing a second potential failure mode.

Preferably, each face of a tooth of the cap which faces towards the open end is provided in a plane which is substantially perpendicular to the axis of the connector, and the face of the recess in the body with which it engages is in the same plane. As mentioned above, increased axial force on the collet causes each tooth of the cap to be forced into the recess. Providing this planar engagement between a face of the tooth and the complimentary face of the recess allows the tooth to slide more deeply into the recess when such a force is applied and also does not produce a cam angle between the cap and the body such that this avoids applying a radially outward force to the body.

The cap and body are preferably made of different materials. This allows the body to be made of a material which is compatible with any liquid that the connector will be used with, while the cap material can be selected primarily for its mechanical requirements.

The recesses in the body may be through holes as these are easier to manufacture. They may, alternatively, be recesses which are closed at their radially outermost face as this provides a neater appearance for the finished connector.

The cap is required to be fitted into the body in a particular angular alignment to ensure that legs of the cap are aligned with the recesses in the body. Preferably, therefore, there are complimentary features in the cap and the body to ensure that they engage in the correct angular alignment.

The cap is designed to be a snap fit within the body and could therefore rely on this snap fit to prevent over insertion of the cap. However, the body is preferably provided with a stop to prevent over insertion of the cap. Preferably this stop is a shoulder adjacent to the or each recess to engage with an end face of the cap. This ensures that the cap will not inadvertently be inserted to a position on which the teeth on the cap pass the recesses in the body.

BRIEF DESCRIPTION OF THE DRAWINGS

An example of a connector in accordance with the invention will now be described with reference to the accompanying drawings in which.

DETAILED DESCRIPTION OF THE INVENTION

Figure 1A:
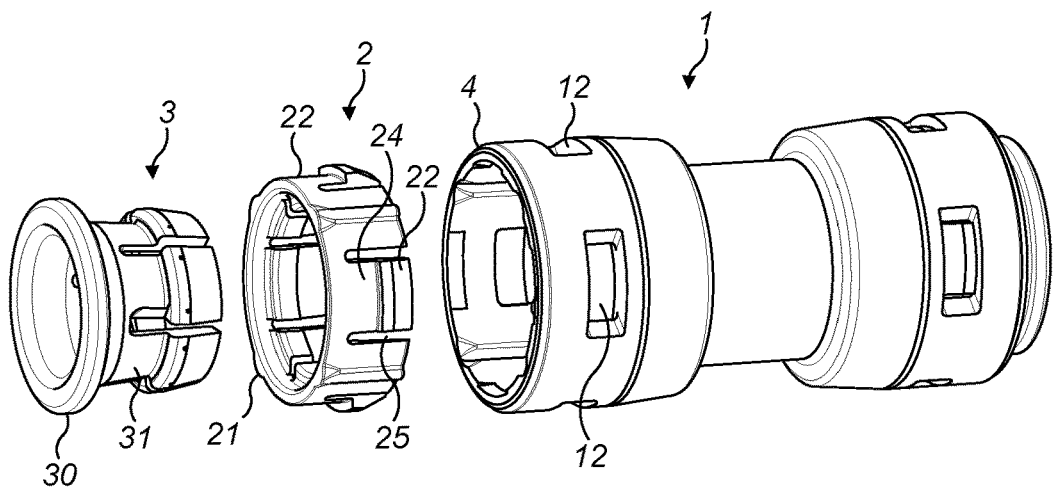
FIG. 1A is a perspective view of a double ended connector with the left hand side being shown as an exploded view and the right hand side being shown assembled.

The connector consists of three main components, namely body 1, cap 2 and collet ring 3. As shown in the drawings, the connector is a double ended connector having a cap 2 at each end. The connector is suitable for connecting two tubes together. However, the invention could equally be applied to a single ended connector to connect the tube to an underlying structure. Alternatively, the double ended connector could be provided with a connector according to the present invention at one end and a different type of connector at the opposite end.

The body 1 is open at one end 4 and has an axial through-way 5 extending through the connector. The throughway 5 is a stepped bore having a narrow diameter portion 6 which corresponds approximately with the inner diameter of the tube to be received. This portion 6 terminates at a first shoulder 7 facing the open end 4 against which the tube abuts, in use. A second shoulder 8 provides a further outward step for the bore and is arranged to receive an O-ring 9 which seals, in use, against the tube.

This part of the body is of conventional design.

Also of conventional design is the collet 3. This comprises an annular ring 30 with a number discrete axially projecting legs 31 each having an inwardly facing tooth 32 to grip on the tube as described below.

The adaptions required relate to the structure at the open end 4 of the body 1 and to the cap 2 design. These will be described below.

The open end 4 of the body 1 is designed to receive the cap 2. It has a plurality of axial extending recesses 11 to align with complimentary ribs 21 on the cap 2. A plurality of through holes 12 are provided through the wall of the body 1 to receive complimentary teeth 22 on the cap 2. Immediately to the right of the through holes 12 is an annular shoulder 13 which is in the plane perpendicular to the axis of the connector to provide an end stop for the cap 2 as this is inserted into the body 1. The face 14 of the recess 12 which faces the shoulder 13 is in a plane perpendicular to the axis for enhanced engagement with the tooth 22 as described below.

Figure 3:
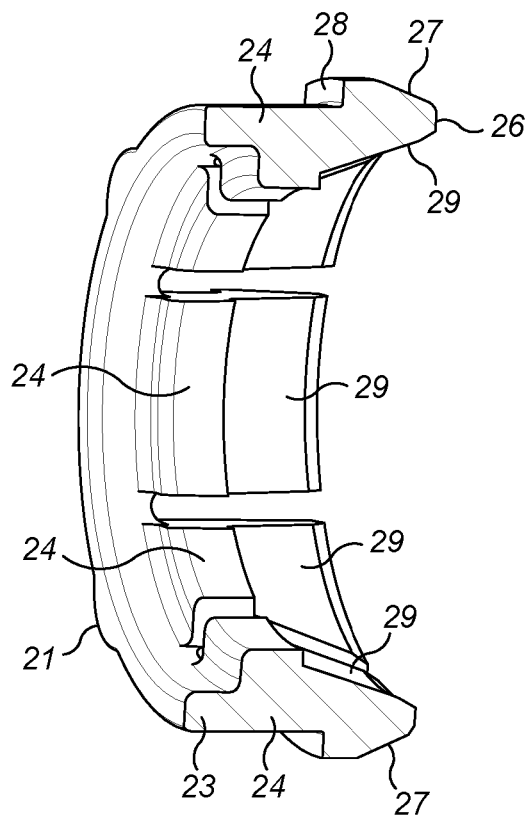
FIG. 3 is a sectioned view of the cap showing the cap of the FIG. 1B in greater detail.

The cap 2 is designed to fit within rather than over the body 1. In a similar manner to the collet, it has an annular ring 23 a number of discrete axially projecting legs 24 separated by slots 25 so that each leg 24 is flexible. At the end of each leg furthest from the open end is an outwardly projecting tooth 22. As best shown in FIG. 3, this has a flat end face 26 to engage with the shoulder 13 to prevent over insertion of the cap. The tooth 22 has a tapered outer surface 27 to allow the legs 24 to be deflected inwardly as the cap 2 is inserted into the body 1. The tooth 22 has a planar face 28 on its outer most surface and facing the open end 4. This is designed such that thte flat end face 26 of the tooth 22 engages with the shoulder 13 in the body 1.

The inner face 29 of the leg 24 is tapered to provide a cap angle.

In order to assemble to connector, the cap 2 is inserted into the body 1 deflecting the legs 24 until the end face 26 of the tooth lands on the shoulder 13. At this point, the legs 24 which have been deflected inwardly by the tapered surface 27 snap into the recesses 12 and the planar face 28 of the tooth engages against the complimentary face 14 in the body 1. The collet can then be inserted in the conventional manner. It is also possible to insert the collet 3 into the cap 2 before inserting both of these together into the cap 1. It is supplied to an end user in this condition.

Figure 1B:
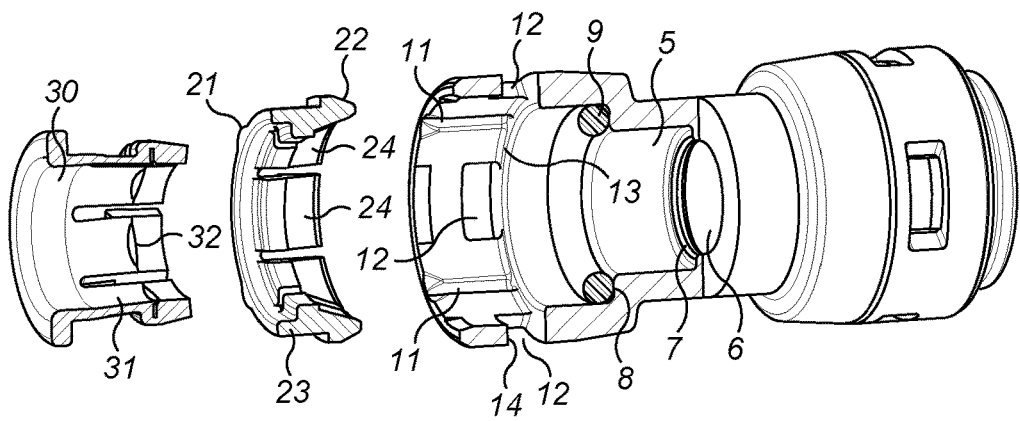
FIG. 1B is a view similar to FIG. 1A with the left hand exploded perspective view shown as having been sectioned along axial plane.
Figure 1C:
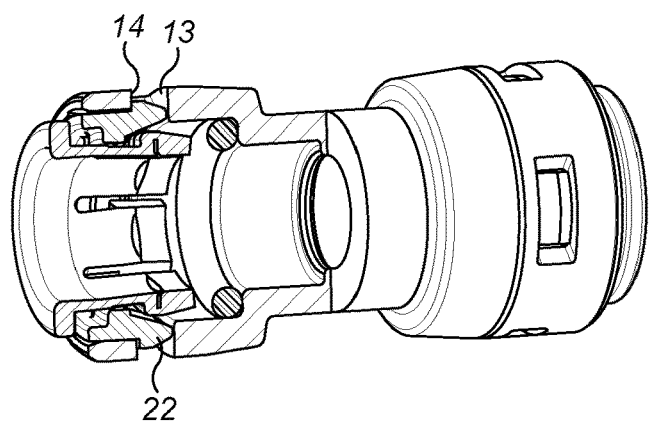
FIG. 1C is a view similar to FIG. 1B in non-exploded form.
Figure 2:
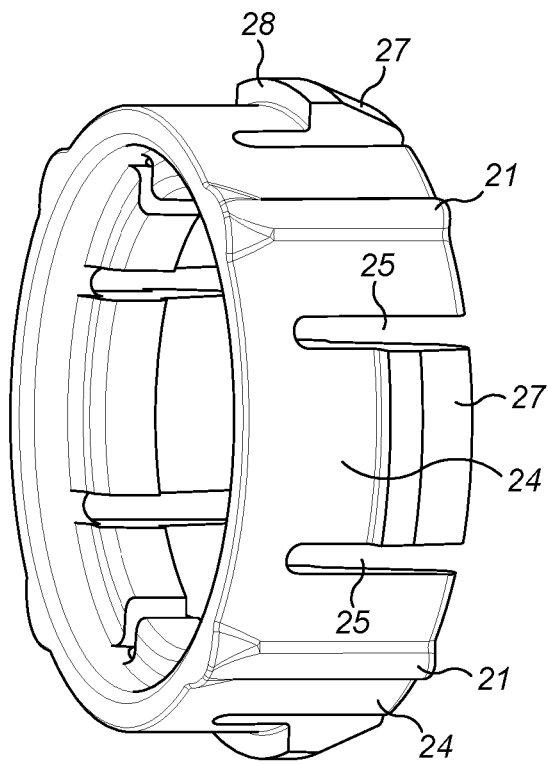
FIG. 2 is a perspective view of the cap showing the same view of the cap as in FIG. 1A but in greater detail.

In the position shown in FIG. 1C, a tube is inserted into the open end and lands of the shoulder 6. The O-ring seal 9 engages with the outer face of the tube to provide a sealed connection while the teeth 32 grip the tube.

The connector is designed to prevent the tube from being removed from the connector by the application only of an axial force on the tube. When an axial force is applied to the tube, the engagement between the teeth 32 and the tube ensures that the collet 3 is moved to the left (using the orientation of FIGS. 1A to 1C). The legs of the collet then ride up at the cap angle 29 causing the legs 31 to be deflected inwardly and the teeth 32 to grip the tube with a force which increases as the axial force on the tube increases. As described thus far, this is the conventional action of the collet.

However, with the current design, as well as the axial force causing an increased gripping force on the tube, the interaction between the collet legs 31 and the legs 24 of the cap 2 provides a radially outward resultant force on the legs 24 which urges the teeth 22 more deeply into the recesses 12 in order to cause the cap 2 to grip more tightly within the body 1. The planar face 28 on the tooth 22 allows the tooth 22 to be deflected into the recess 12 and the face to face contact between the face 28 and the face 14 provides a strong resistance to the axial force.

Figure 4A:
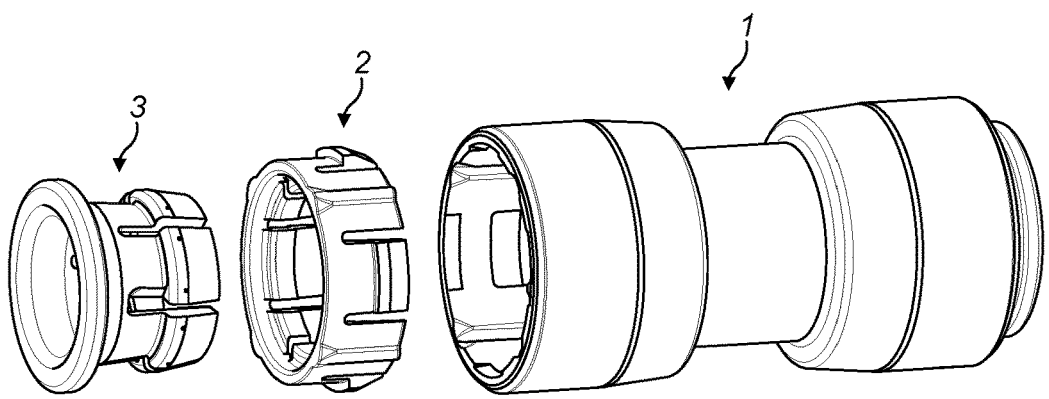
FIGS. 4A to 4C are views corresponding to FIGS. 1A to 1C of a second example.
Figure 4B:
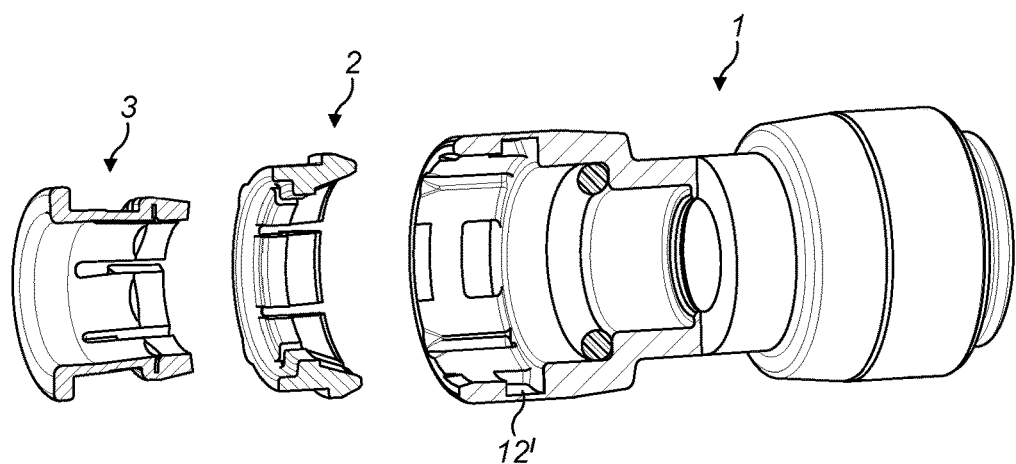
Figure 4C:
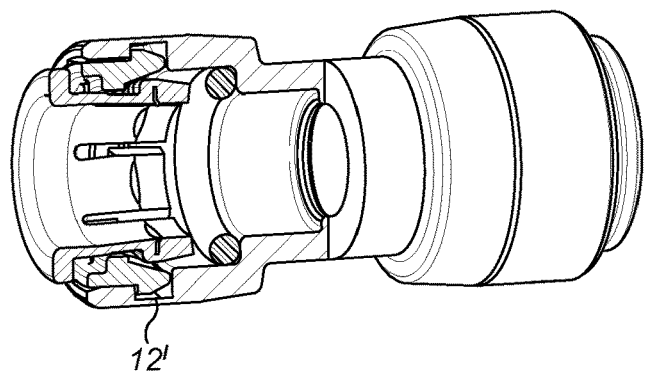

The second example shown in FIGS. 4A to 4C is the same in most respects as the first example. However, the through holes 12 have been replaced by recesses 12' which are closed at their radially outermost face. The operation of the two connectors is the same. However, as will be appreciated from FIG. 4A, the appearance of the connector is neater.

The invention claimed is:

1. A connector comprising:
   a body having a through-way defining an axis, the body having an open end;
   a shoulder in the through-way faces the open end of the body and supports an 0-ring;
   a cap fitted within the open end of the body and extending from the open end towards an opposite end, the cap being retained in the body by a snap fit, the cap having a plurality of legs extending away from the open end, the legs each having an outwardly extending tooth at the end opposite to the open end to engage with a complementary recess in the body to provide the snap fit, the plurality of legs each having a rib defined on an inner surface of the cap; and
   a collet in the cap and having a plurality of legs extending away from the open end, at least one collet leg engaging with a leg of the cap and having an inwardly facing tooth to grip, in use, a tube in the through-way, the collet having a circumferential recess for receiving the rib of each one of the plurality of legs;
   the cap having an inwardly facing tapered surface that is tapered to provide a cap angle that engages, in use, with the collet legs such that axial movement of the collet towards the open end causes inward deflection of the collet legs and causes a radially outward force to be applied to the legs of the cap via the tapered surface to urge the or each tooth of the cap into its the respective complementary recess.

2. A connector according to claim 1, wherein each face of the tooth of the cap which faces towards the open end is provided in a plane which is substantially perpendicular to the axis of the body, and the face of the recess in the body with which the tooth of the cap engages is in the same plane.

3. A connector according to claim 1, wherein the cap and body are made of different materials.

4. A connector according to claim 1, wherein the recesses are through holes.

5. A connector according to claim 1, wherein the recesses are closed at their radially outermost face.

6. A connector according to claim 1, further comprising complementary features in the cap and the body to ensure that the cap and the body are in the correct angular alignment.

7. A connector according to claim 1, wherein the body is provided with a stop to prevent over insertion of the cap.

8. A connector according to claim 7, wherein the stop is a shoulder adjacent to a respective recess to engage with an end face of the cap.

9. A connector according to claim 1, wherein the cap is retained substantially entirely within the body.

10. A connector according to claim 1, wherein the collet protrudes from the open end of the body.

11. A connector comprising:
    a body having a through-way defining an axis, the body having an open end;
    a shoulder in the through-way faces the open end of the body and supports an O-ring;
    a cap fitted within the open end of the body and extending from the open end towards an opposite end, the cap being retained in the body by a snap fit, the cap having a plurality of legs extending away from the open end, the legs each having an outwardly extending tooth at the end opposite to the open end to engage with a complementary recess in the body to provide the snap fit; and
    a collet in the cap and having a plurality of legs extending away from the open end, at least one collet leg engaging with a leg of the cap and having an inwardly facing tooth to grip, in use, a tube in the through-way;
    wherein the cap has an inwardly facing tapered surface that is tapered to provide a cap angle that engages, in use, with the collet legs such that axial movement of the collet towards the open end causes inward deflection of the collet legs and causes a radially outward force to be applied to the legs of the cap via the tapered surface to urge the or each tooth of the cap into the respective complementary recess; and
    wherein the recesses are closed at their radially outermost face.

12. A connector according to claim 11, wherein each face of the tooth of the cap which faces towards the open end is provided in a plane which is substantially perpendicular to the axis of the body, and the face of the recess in the body with which the tooth of the cap engages is in the same plane.

13. A connector according to claim 11, wherein the cap and body are made of different materials.

14. A connector according to claim 11, further comprising complementary features in the cap and the body to ensure that the cap and the body are in the correct angular alignment.

15. A connector according to claim 11, wherein the body is provided with a stop to prevent over insertion of the cap, and wherein the stop is a shoulder adjacent to a respective recess to engage with an end face of the cap.

16. A connector comprising:
    a body having a through-way defining an axis, the body having an open end;
    a shoulder in the through-way faces the open end of the body and supports an O-ring;
    a cap fitted within the open end of the body and extending from the open end towards an opposite end, the cap being retained in the body by a snap fit, the cap having a plurality of legs extending away from the open end, the legs each having an outwardly extending tooth at the end opposite to the open end to engage with a complementary recess in the body to provide the snap fit; and
    a collet in the cap and having a plurality of legs extending away from the open end, at least one collet leg engaging with a leg of the cap and having an inwardly facing tooth to grip, in use, a tube in the through-way;
    wherein the cap has an inwardly facing tapered surface that is tapered to provide a cap angle that engages, in use, with the collet legs such that axial movement of the collet towards the open end causes inward deflection of the collet legs and causes a radially outward force to be applied to the legs of the cap via the tapered surface to urge the or each tooth of the cap into the respective complementary recess;
    wherein the body is provided with a stop to prevent over insertion of the cap; and
    wherein the stop is a shoulder adjacent to a respective recess to engage with an end face of the cap.

17. A connector according to claim 16, wherein the cap is retained substantially entirely within the body.

18. A connector according to claim 16, further comprising complementary features in the cap and the body to ensure that the cap and the body are in the correct angular alignment.

19. A connector according to claim 16, wherein the recesses are closed at their radially outermost face.

20. A connector according to claim 16, wherein the collet protrudes from the open end of the body.

* * * * *